United States Patent
Graves et al.

(10) Patent No.: US 6,464,364 B2
(45) Date of Patent: Oct. 15, 2002

(54) DEFORMABLE CURVATURE MIRROR

(75) Inventors: J. Elon Graves; Malcolm J. Northcott, both of Kailua, HI (US)

(73) Assignee: AOptix Technologies, Inc., Campbell, CA (US)

( * ) Notice: Subject to any disclaimer, the term of this patent is extended or adjusted under 35 U.S.C. 154(b) by 0 days.

(21) Appl. No.: 09/769,988

(22) Filed: Jan. 25, 2001

(65) Prior Publication Data

US 2001/0040743 A1 Nov. 15, 2001

Related U.S. Application Data

(60) Provisional application No. 60/178,416, filed on Jan. 27, 2000.

(51) Int. Cl.[7] .................... G02B 26/00; G02B 7/182
(52) U.S. Cl. ................. 359/846; 359/224; 359/291; 359/295
(58) Field of Search .................. 250/201.9; 359/224, 359/290, 291, 292, 846, 295, 838

(56) References Cited

U.S. PATENT DOCUMENTS

| | | | | |
|---|---|---|---|---|
| 4,128,309 A | * | 12/1978 | Lehureau et al. | 359/846 |
| 4,257,686 A | * | 3/1981 | Albertinetti et al. | 359/295 |
| 4,298,247 A | * | 11/1981 | Michelet et al. | 359/291 |
| 4,420,222 A | * | 12/1983 | Bret et al. | 359/846 |
| 4,588,268 A | * | 5/1986 | Aldrich | 359/849 |
| 5,262,696 A | * | 11/1993 | Culp | 310/328 |
| 5,329,322 A | | 7/1994 | Yancey | 351/211 |
| 5,576,780 A | | 11/1996 | Yancey | 351/211 |
| 5,777,719 A | | 7/1998 | Williams et al. | 351/212 |
| 5,907,153 A | * | 5/1999 | Gouch | 250/236 |
| 5,949,521 A | | 9/1999 | Williams et al. | 351/246 |
| 6,023,057 A | | 2/2000 | Gaffard et al. | 250/201.9 |

FOREIGN PATENT DOCUMENTS

| | | | |
|---|---|---|---|
| FR | 2 389 143 | * | 11/1978 |
| GB | 2 247 323 A | * | 2/1992 |
| WO | WO 97/12267 | * | 4/1997 |

OTHER PUBLICATIONS

Hua Wei Zhou, et al., "Prototype Bimorph Mirror for the AAT Adaptive Optics System", SPIE vol. 3126 (Adaptive Optics and Applications), pp. 384–391, 1997.*

Erez N. Ribak, "Deformable Mirrors", Adaptive Optics for Astronomy, D.M. Alloin and J. M. Mariotti (eds.), Kluwer Academic Publishers, Netherlands, pp. 149–162, 1994.*

Andrey G. Safronńov, "Bimorph Piezoelectric Structures in Laser and Astronomical Adaptive Optics", Conference on Lasers and Electro–optics, Europe 1996 (CLEO/Europe 1996), Tuesday/1991, CTuK4.*

(List continued on next page.)

Primary Examiner—Cassandra Spyrou
Assistant Examiner—John Juba, Jr.
(74) Attorney, Agent, or Firm—Lyon & Lyon LLP

(57) ABSTRACT

A deformable curvature mirror capable of controlled deformation by applying electrical voltages to electrode segments on the back of the mirror. Two plates of an electro-restrictive material, such as PZT or PMN, are jointed together with at least one conductive layer sandwiched therebetween. One plate has an outer conductive layer and a mirrored surface on the outer conductive layer. The conductive layers are electrically grounded. The other plate has a pattern of a plurality of electrode segments on the outer surface with each electrode segment having a separate electrical terminal for applying a variable electrical voltage thereto for separately transmitting a variable current through each electrode segment and through at least the other plate for causing variable expansion of the plate and thereby selectively deforming that plate and, in turn, the deformable curvature mirror.

40 Claims, 4 Drawing Sheets

OTHER PUBLICATIONS

A. Chellabi, et al., "A New Control Algorithm for Bimorph MIrrors", Systems, Man, and Cybernetics, 1995. Intelligent Systems for the 21$^{st}$ Century. IEEE Conf. on, vol. 1, 1995, pp. 569–573.*

J.E. Graves, et al., "Latest Results from the University of Hawaii Prototype Adaptive Optics System", Univ. Hawaii Laser Guide Star Adaptive Optics Workshop: Proceedings—vol. 1 (Mar. 10–12, 1992), pp 511–521.

Publication entitled "A Simple Low–Order Adaptive Optics System For Near–Infrared Applications"; Publications of the Astronomical Society of the Pacific; vol. 103, Jan. 1991, No. 659 by Roddier et al. pp 131–149.

Proceedings of SPIE 3353, Mar. 1998 entitled First Light For Hokupa'a; Author Graves et al.

Publication entitled "Objective Measurement of Wave Aberrations of the Human Eye with the Use of a Hartmann–Shack Wave–Front Sensor", J. Opt. Soc. Am. A., vol. 11, No. 7, Jul. 1994; Authors Liang et al. pp 1949–1957.

Publication entitled "Scanning Laser Tomography of the Living Human Eye" in Noninvasive Diagnostic Techniques in Ophthalmology. Masters BR (ed.), Springer–Verlag, pp. 528–547 (1990); Authors Bille et al.

Publication entitled "Measurement of the Wave Aberration of the Human Eye"; Biophysics 1961; 6: 776–94; by Smirnov MS (Translated).

Publication entitled "Subjective Measurement of High-Order Aberrations of the Eye", Science 1976; 193: 580–2 by Howland B. et al.

Publication entitled "A Subjective Method for the Measurement of Monochromatic Aberrations of the Eye", J. Opt Soc. Am 1977; 67(11): 1508–1518 by Howland HC et al.

Publication entitled "Objective Technique for the Determination of Monochromatic Aberrations of the Human Eye", J. opt. Soc. Am. A., vol. 1, No. 9, pp. 987–992 (1984) by Walsh et al.

Publication entitled "Measurement of the Axial Wavefront Aberration of the Human Eye", Opthal Physiol Opt. 1985; 5: 23–31 by Walsh, G. et al.

Publication entitled "Wavefront Aberration of the Eye: A Review"; Optometry and Vision Science 1991; 68(8): 574–583 by Charman WN.

Publication entitled "Measurement of Monochromatic Ocular Aberrations of human Eyes as a Function of Accommodation by the Howland Aberroscope Technique"; Vision Res. 1995: 35(3): 313–23 by Atchinson DA et al.

Publication entitled "Reliability and Validity Studies of a New Computer–Assisted Crossed–Cylinder Aberroscope"; Optom Vis. Sci. 1997; 74(7): 570–80 by Cox MJ et al.

Publication entitled "Retrieval of Wave Aberration of Human Eyes from Actual Point–Spread Function Data"; J. Opt Soc. Am 1988; 5(8); 1201–6 by Artal P. et al.

Publication entitled "Wavefront Determination Resulting From Foucault Tests Applied to the Human Eye and Visual Instruments"; In Optical instruments and Techniques, Dickson JH (ed.), London, Oriel, 1969, 375–85.

Publication entitled "Computing High order Wave Aberration Coefficients from Small Variations of Best Focus for Small Artificial Pupils"; Vision Res. 1989; 29(8); 979–83 by Howland HC et al.

Publication entitled "Active Optical Depth Resolution Improvement of the Laser Tomographic Scanner"; Applied Optics, vol. 28, No. 4, pp. 804–808, (1989) by Dreher et al.

Publication entitled "Curvature Sensing and Compensation: A New concept in Adaptive Optics"; applied Optics, vol. 27, pp. 1223–1225, by Roddier F. Apr. 1, 1988.

Publication entitled "Wavefront Sensing and the Irradiance Transport Equation"; Applied Optics, vol. 29 (10), pp. 1402–1403, 1990 by Roddier F.

Publication entitled "New Optical Testing methods Developed at the University of Hawaii; Results of Ground–Based Telescopes and Hubble Space Telescope"; SPIE, vol. 1531, pp. 37–43, 1991 by Roddier C. et al.

* cited by examiner

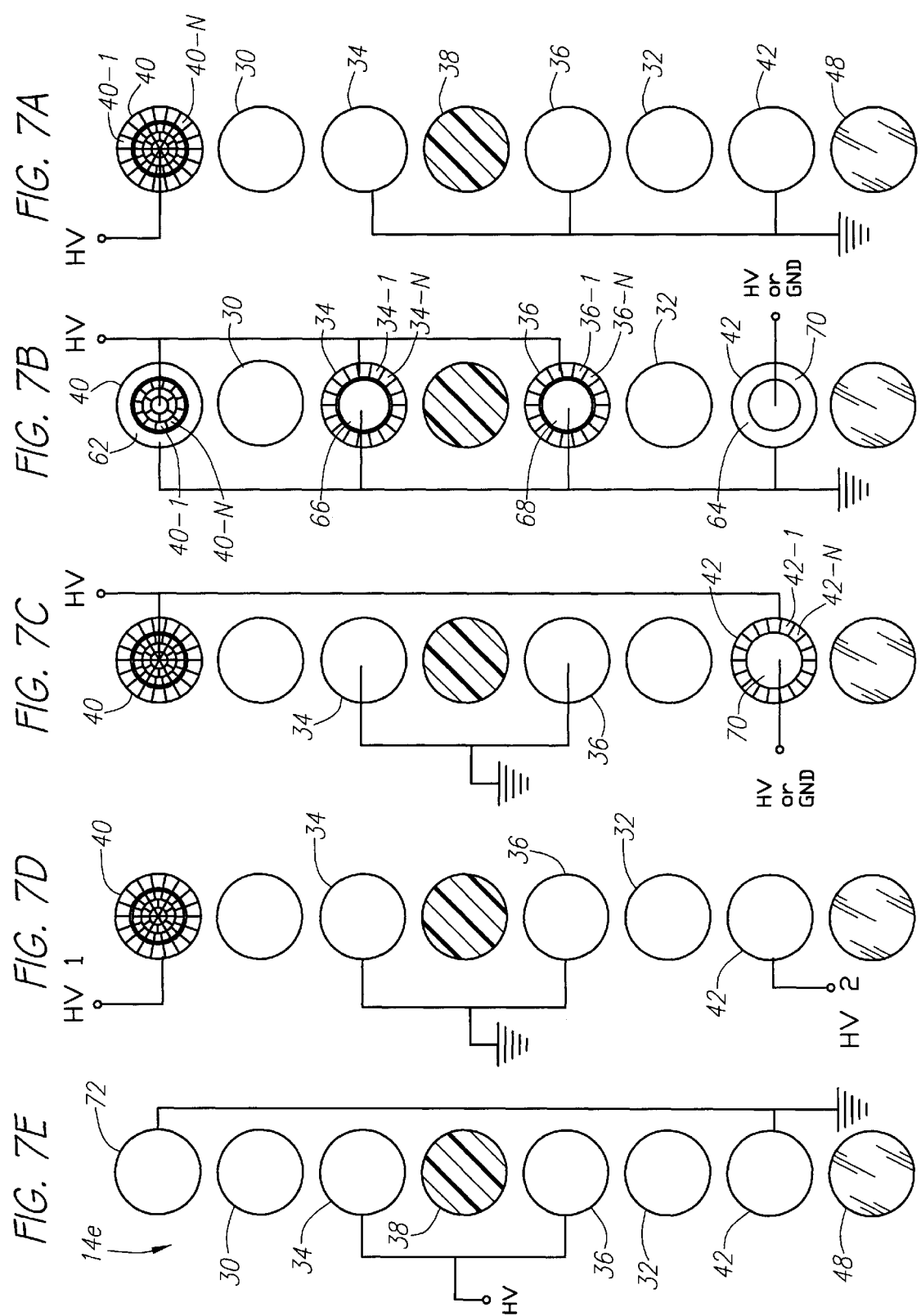

DEFORMABLE CURVATURE MIRROR

This application bases priority on Provisional Patent Application Serial No. 60/178,416, filed Jan. 27, 2000.

The present invention relates to a deformable curvature mirror that is capable of controlled deformation by the application of electrical voltages to the mirror and, in particular, is directed to such a mirror that is for use in an adaptive optics system having a wavefront sensor for controlling the deformation of the curvature mirror.

There are various adaptive optics methods and devices which include a wavefront sensor for sensing the aberrations in the wavefront of light waves and then correcting or compensating for those aberrations, such as the atmospheric aberrations that effect the viewing of stars and planets through a telescope. The existing methods and devices for sensing and measuring the wavefront include several interferometric techniques, the Shack-Hartmann wavefront sensing techniques and various other systems involving the projection of patterns of light through an optical system. Such prior techniques and systems are typically complex and expensive, as well as having various inherent deficiencies. In addition to the deficiencies of the prior art wavefront sensors, the deformable mirrors that are controlled by those wavefront sensors for adaptive optics also include numerous deficiencies. For example, a stack actuator mirror is comprised of a multiplicity of push rods engaging the back of a flexible mirror and the extension-retraction of each push rod is usually controlled by a Shack-Hartmann wavefront sensor. The Shack-Hartman wavefront sensor measures local slopes of the wavefront and these slopes are fitted with a wavefront reconstructor which in turn generates a continuous surface, matching all the slopes. This type fitting is blind to hysterisis effects in the actuators thereby causing a waffle pattern to appear on the mirror surface. The push rods tend to produce a deformation which is nearly a straight line on the mirror surface between each pair of adjacent push rods that results in large fitting errors when a small number of actuators are used. Moreover, the number of push rods and, therefore, the closeness of the push rods is physically limited, as well as the length of their travel, whereby the accuracy and degree of optical correction that can be applied by the stack actuator type mirror is limited. Since all actuators have the same travel and are attached to a rigid reference surface, the mirror has the same stroke for all modes, i.e. low order focus has the same stroke as the highest mode produced by every other actuator being turned on and off. For correcting the aberrations originating in the atmosphere, this range of stroke at the highest modes is not necessary, whereby the corrections may not be accurate for small errors.

Further, some other wavefront sensing and deformable mirror techniques and devices are not directly applicable to all types of adaptive optics for correcting the wavefront to thereby correct the image.

In summary, it is an object of the present invention to provide a novel deformable curvature mirror that is capable of controlled deformation by selectively applying electrical voltages to produce a wide range of accurate curvatures for correcting the wavefront of light in an adaptive optics system. A further object of the present invention is to provide a deformable curvature mirror that includes a pattern of electrode segments on the backside of the mirror that are of a size, shape and arrangement for producing the mirror deformation necessary for the particular application of the mirror by selectively applying variable voltages to the individual electrode segments. A still further object of this invention is to provide a unique construction of a deformable curvature mirror that includes two plates of electrorestrictive or magnito-restrictive material adhered together in a bimorph and monomorph configuration. Typically two plates of similar PZT type are glued together with an adhesive, then a mirror surface is placed on one side, and a pattern of electrode segments is placed either between or on the back side, whereby the application of a variable voltage to the individual electrodes causes a charge to accumulate on the conductive layer thereby producing an electric field for causing a controlled expansion or contraction of the electrorestrictive plates in the individual areas defined by the electrode segments. In the case where the electrode pattern is on the rear plate, the front plate acts as a restraining member and with the expansion or contraction of the rear plate a local bending moment occurs for thereby producing a curvature of that section of the mirror. Still another object of the present invention is to provide such a deformable curvature mirror with one set of electrode segments for controlling the slope of the wavefront at the edges of the pupil and another set of electrode segments for controlling the curvature of the wavefront inside the pupil.

Other and more detailed objects and advantages of the present invention will appear to those skilled in the art from the detailed description of the preferred embodiments in conjunction with the drawings, wherein:

FIGS. 7A–7E are diagrammatic views illustrating the layers of different materials that comprise various embodiments of the deformable curvature mirror of the present invention.

Figure 1:
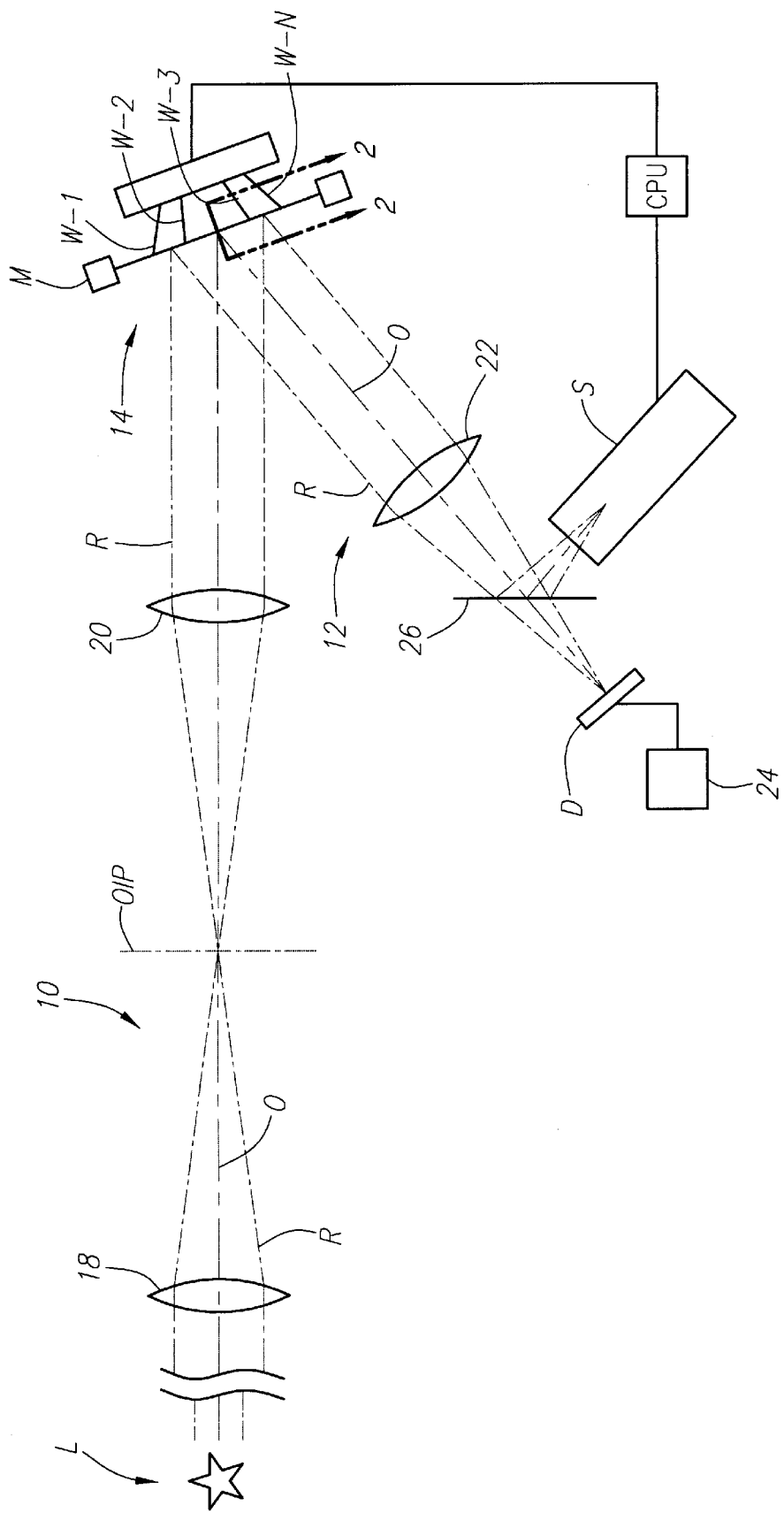
FIG. 1 is a diagrammatic illustration of a typical optical system, namely, a telescope, provided with an adaptive optics system that includes the deformable curvature mirror of the present invention.

Referring now to FIG. 1, a simplified form of an optical system, such as a telescope 10, is illustrated with an adaptive optics system, generally designated 12, that includes the deformable curvature mirror 14 of the present invention. Light rays R from any light source L, such as the illustrated star when the telescope 10 is used for observing stars and planets, enter the telescope 10 through a lens 18 that focuses the light rays on an object image plane OIP where the image of the light source L (here a star, for example) exists in focus but is uncorrected. The telescope 10 also may be of a type and construction for receiving light waves from an earthbound data transmission station L, such as in a system for transmitting data from building-to-building, tower-to-tower, mountain-to-mountain or from ground to space.

The light rays R then pass through a collimating lens 20 to the deformable mirror 14 of this invention. Thus, in FIG. 1, the light rays R reaching the telescope 10 from a distant star or other distant light source L would be undistorted and theoretically could produce a diffraction limited image of the source. However, as is well known to astronomers, the earth's atmosphere creates aberrations in the light rays R before reaching the telescope 10, which aberrations vary with the atmospheric conditions and rapidly over any period of time, even when the telescope is located at high elevations. Similarly, if the telescope 10 is used for viewing something on earth at a distance or for receiving light waves for data transmission from a station at a distance on earth, the earth's atmosphere will create aberrations in the light rays R and, therefore, produce a wavefront that can not produce a diffraction limited image and is constantly changing when it reaches the telescope 10. Various wavefront sensors have been used to detect the variations in the wavefront caused by the atmospheric aberrations and then to compensate or correct for those aberrations by adaptive optics, such as by using a deformable mirror controlled by a wavefront sensor. One type of wavefront sensor that is particularly suited for use with the deformable curvature mirror 14 of the present invention is a wavefront curvature sensor that uses a pair of defocused pupil images as described and shown in the copending U.S. patent application, Ser. No. 09/579,786, filed May 26, 2000 by the inventors hereof, which is incorporated herein by this reference.

The light rays R reflect from the surface of the deformable mirror 14 to a lens 22 that refocuses the image on the plane of an image detector D. The lens 18, collimating lens 20, deformable mirror 14, lens 22 and image detector D are all located and centered on the optical axis O of the system. The image detector D may be of any convenient type that is suitable for the particular application of the system, such as a conventional detector in a video camera, a custom format of charge couple device (CCD), an array of PIN diodes, an array of optical fibers, photon counting detectors, or the like. The detector D provides images and/or data relative to the light intensity throughout the image focused on detector D and these images and/or data are displayed and/or recorded on an appropriate device 24 suitable for this application of the system. When the deformable mirror 14 is not activated and working in closeloop with the wavefront sensor, the image appearing at the image detector D will be the uncorrected image received by telescope 10. When the deformable mirror 14 is appropriately deformed in the manner described below to compensate for the aberrations, the image at detector D will be diffraction limited, i.e. a corrected image. Similarly, if the system is used for data transmission by light waves, the detector D will receive and detect corrected light rays when the deformable mirror 14 is properly deformed to correct for aberrations in the light rays R transmitted to the system illustrated in FIG. 1. Still further, when such a system is used for transmitting data by light rays, the wavefront can be sensed and corrected by the deformable mirror 14 and the same mirror shape can be used to pre-correct a data light emitter positioned at the same location as image detector D.

A partial mirror or beamsplitter 26 is positioned on the optical axis O between lens 22 and detector D for reflecting a portion of the light rays R to a wavefront sensor S, such as one of the wavefront sensors disclosed in the inventors' copending patent application identified above. In the preferred embodiment of the system employing the deformable mirror 14 of the present invention, the wavefront sensor S senses two defocused pupil images (or the shapes and light intensities for some detectors used in a wavefront sensor S) which are communicated to the central processing unit CPU for processing by data reduction software to derive the wavefront curvature and provide data appropriate for the operation of the deformable mirror 14. Specifically, as is well known in the art, the wavefront is derived or recovered by solving the Poisson equation with respect to intensities with the Dirichlet's boundary conditions relative to the shape of the extrafocal images. An iterative data reduction algorithm or other non-linear fitting technique may be employed to compensate for non-linearity in measurements in an open loop system. The CPU then provides a plurality of separate and controlled high voltage electrical potentials to a plurality of conductive electrode segments (described below) on the back of deformable mirror 14 through a like plurality of separate wires W-1, W-2, W-3 through W-N. The deformable mirror 14 is fixedly mounted in a mount M that is appropriately positioned to reflect the optical axis O and light rays R from the collimating lens 20 to the detector D. As will appear more fully from the description below of the details of a preferred embodiment of the deformable mirror 14, the overall slope of the mirror, i.e. the angle of reflection of the optical axis O, can be modified by the application of high voltages applied to selected electrode segments of the deformable mirror 14 through one or more of the wires W-1 through W-N and the curvature of the surface of the deformable mirror 14 may be modified for correcting aberrations by the application of controlled high voltages also through wires W-1 through W-N.

Figure 2:
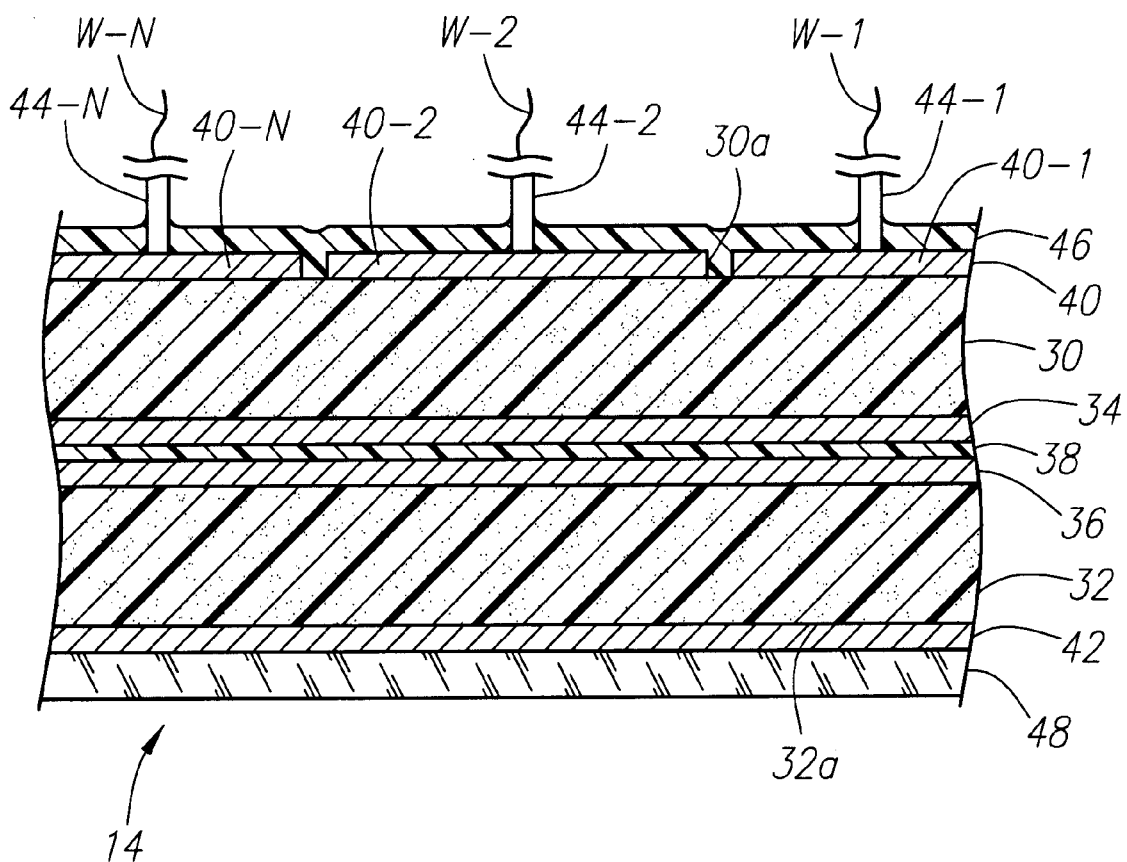
FIG. 2 is an enlarged, fragmentary sectional view through a portion of the deformable curvature mirror taken substantially on the line 2—2 in FIG. 1.

Referring now to FIG. 2, a fragmentary and enlarged cross-section of a portion of the deformable curvature mirror 14, taken on the line 2—2 in FIG. 1, is shown with the thicknesses of some of the layers of the laminated construction exaggerated for ease of illustration. The basic, physical structure of the deformable mirror 14 is comprised of two discs or plates 30 and 32 of any electro-restrictive material that exhibits controlled expansion and contraction in response to the application of an electrical potential across the material and yet the material has an adequate structural strength and rigidity to maintain a given shape, as distinguished from being flexible. A preferred material is ceramic PZT, which is a piezoelectric material comprised of Pb, Zu, Ti and O though a possible alternative is a magnetorestrictive material known as PMN comprised of Pb, Mg, Nb and O. The plates 30 and 32 of the electro-restrictive material are separately ground to produce optically flat surfaces and a uniform thickness that depends on the size of the deformable mirror 14 but, in general, sufficiently thin to accommodate the flexures caused by the expansion and contraction induced by the electrical voltages. For example, in a deformable mirror 14 of about 50 mm in diameter, each of the PZT plates 30 and 32 preferably would be less than two millimeters and more than 0.1 mm in thickness. Similarly, for a larger mirror 14 of about 150 mm in diameter, each plate 30 and 32 preferably would of a thickness between about 2.0 mm and 8.0 mm. A layer 34 of gold or other highly conductive material (hereinafter referred to as a gold layer for convenience) is applied to the lower surface of plate 30 and a gold layer 36 is applied to the upper surface of plate 32 and then the two plates 30 and 32 are laminated together and joined by a conductive adhesive 38. The PZT plates have a polarity in a direction perpendicular to the deformable mirror 14 which causes the PZT to expand when an electrical voltage is applied in one direction across the plate and to contract when the electrical voltage is applied in the opposite direction across the plate. Before the two plates 30 and 32 are joined by the conductive adhesive 38, the respective polarities of those two plates are aligned, that is, each plate 30 and 32 will exhibit a physical contraction in the direction perpendicular to the mirror 14 when an electric field created by the applied voltage with the positive potential on top and the negative potential on the bottom, as shown in FIG. 2. Thus, as will appear more clearly below, to the extent that any electric field traverses the lower PZT plate 32, which is primarily inactive, the directions of expansion and contraction of the two plates 30 and 32 will be the same rather than tending to oppose each other.

After the two plates 30 and 32 are bonded together by the adhesive layer 38, a plating mask (not shown) is applied to the outer surface 30a to create a predetermined pattern, as described below, and then gold layers 40 and 42 are applied to the outer surfaces 30a and 32a, respectively, of the plates 30 and 32. The mask and gold covering the mask on surface 30a are removed to leave a pattern of gold electrodes 40-1, 40-2 through 40-N, only three of which are shown in the enlarged, fragmentary view of FIG. 2.

A mirror layer 48 is applied to the outer surface 32a of plate 32 by any convenient means such as epoxy replication wherein the mirror layer 48 is first formed separately and then adhered to the surface 32a. Forming the mirror layer 42 by the epoxy replication method includes the steps of applying a mold separation material on a flat surface, applying a layer of reflective material, such as silver or gold, and then a layer of epoxy before adhering the mirror layer 48 to the gold layer 42 on the outer surface 32a of plate 32 by an appropriate adhesive, such as epoxy, and curing the assembly at an elevated temperature. As an alternative to a separate mirror layer 48, the outer surface of gold (or other metal) layer 42 may be polished to a mirror-like condition, which may be adequate for some applications of the deformable mirror 14.

Electric terminals 44-1, 44-2 through 44-N are attached to the electrode segments 40-1 through 40-N by any convenient means, such as soldering. An insulating layer 46 is then applied over the gold layer 40 (comprised of electrode segments 40-1 through 40-N) and fills to gaps between the electrode segments formed by the mask material.

When the deformable mirror 14 is installed in an adaptive optics system, such as the system shown in FIG. 1, the wires W-1 through W-N are attached to the terminals 44-1 through 44-N, respectively. Electrical terminals and wires are also attached to the intermediate gold layers 34, 36 and the outer gold layer 42 by any convenient means, such as at the edge of the deformable mirror 14 or by drilling through the deformable mirror 14 near the periphery and installing one or more terminals and wires. As thus far described, it may be seen that in one preferred embodiment where the gold layers 34, 36, 42 are all connected to ground and a positive voltage is applied to one or more of the wires W-1 through W-N that an electric field will appear across electro-restrictive plate 30 to gold layer 34 from each electrode segment 40-1 through 40-N to which the electrical potential has been applied and that some electric charge may flow through the conductive adhesive layer 38 to gold layer 36 establishing an electric field across plate 32 to grounded gold layer 42. The electric field will cause lateral expansion of the plate 30 and to a lesser degree the plate 32. The magnitude of the expansion below each electrode segment 40-1 through 40-N will depend on the magnitude of the voltage applied to that electrode segment which expansion in turn causes the mirror 14 to deform in a controlled manner as a result of the electro-restrictive properties of the materials of the plates 30 and 32.

By way of further explanation of the basic principle of operation of mirror 14, as the rear plate 30 expands and contracts in the areas to which the electrode segments 40-1 through 40-N are affixed, as the electric fields are generated by the voltages applied to those electrode segments, the front (mirrored) plate 32 does not correspondingly expand and contract, and therefore a bending moment is introduced into the mirror 14. In this basic embodiment of mirror 14, both sides of front plate 32 have a gold layer which are electrically connected so that the front plate 32 and rear plate 30 mechanically behave in the same manner, such as with respect to thermal expansion and contraction, because the thermal expansion coefficient is controlled by grounding. The build-up of an electrical charge in PZT by temperature changes causing expansion and contraction would store energy in the PZT and adversely effect the control of the curvature of the mirror surface 48.

Figure 3:
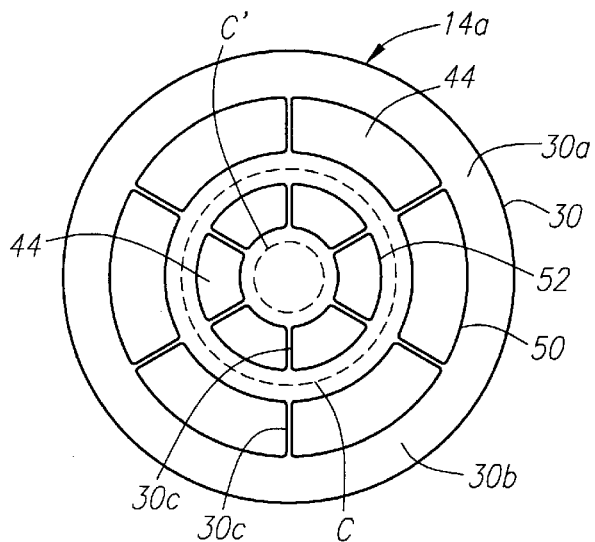
FIGS. 3–6 are elevation views of the rear side of the deformable curvature mirror of the present invention illustrating four different patterns of electrode segments.
Figure 4:
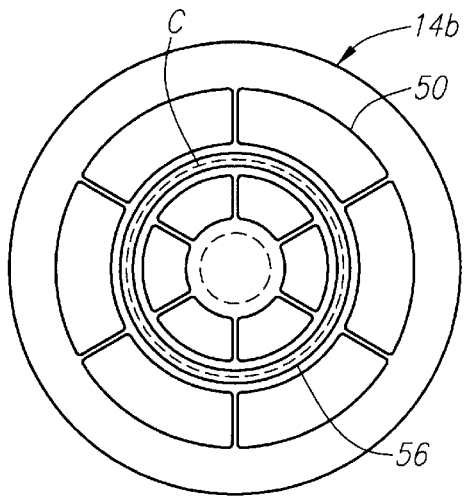
Figure 5:
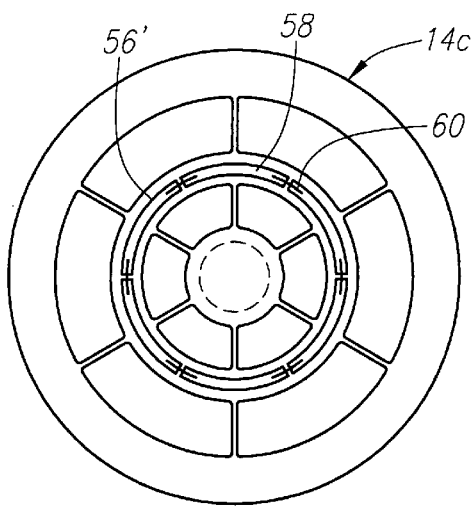

Referring now to FIGS. 3–6, which are plan views from the back, four typical patterns for the electrodes 40 on the deformable mirror 14 are shown with the terminals 44-1, 44-N omitted for clarity. Also, for convenience of illustration and comparison of electrode patterns, each of the deformable mirrors 14a, 14b, 14c and 14d of FIGS. 3, 4, 5 and 6, respectively, is shown as being round and of the same size but it will readily appear to those skilled in the art that the deformable mirror 14 may be of a non-round shape for non-round adaptive optic systems, such as for lasers, and may be of different sizes, such as four different sizes of telescopes. The pattern of electrode segments 40-1, 40-N on the outer surface 30a of plate 30 is formed by the mask that is applied to the outer surface 30a prior to applying the gold layer 40, as described above. The mask for each of the deformable mirrors 14a–14d includes a perimeter portion to create a perimeter ring 30b of exposed surface of the plate 30, as well as the outer surface 32a of plate 32, for mounting the deformable mirror 14 in a supporting mount M (see FIG. 1). Thin strips of the masking material extend radially like spokes on the surface 30a to form gaps 30c between adjacent electrode segments 40-1, 40-N formed in circular rings, such as the outer rings 50 and inner rings 52 shown in FIGS. 3–6 and the central ring 54 shown in FIG. 6. In the embodiments of FIGS. 3, 4 and 5, there are six electrode segments in the outer ring 50 and six electrode segments forming the inner ring 52, whereas in the electrode pattern of FIG. 6, there are eighteen electrode segments 44 in the outer ring 50, twelve electrode segments in the inner ring 52 and six electrode segments 44 in the central ring 54, but any number of electrode segments and separate rings may be used for a particular application.

In each of the electrode patterns illustrated in FIGS. 3–6, an annular space is provided between the outer ring 50 and inner ring 52 of electrode segments, and the circular dashed line C in that annular space represents the outer diameter of the image received by the optical system, such as the outer diameter of the pupil image received by the telescope 10. Similarly, a dashed line C' at the center of each mirror 14 in FIGS. 3–6 represents the inner diameter of the pupil image of a reflective celestial telescope where no image appears inside of circle C'. In other words, although the mirror layer 48 may cover the entire portion of the surface of the deformable mirror 14 opposite the surface portion having the electrode patterns shown in FIGS. 3–6, the image from the celestial telescope is only reflected from the portions of the mirror between the outer diameter C and inner diameter C'. In a nonreflective type telescope or other optical system, the image would cover the entire area within outer circle C with no inner blank space within the circle C'.

Figure 6:
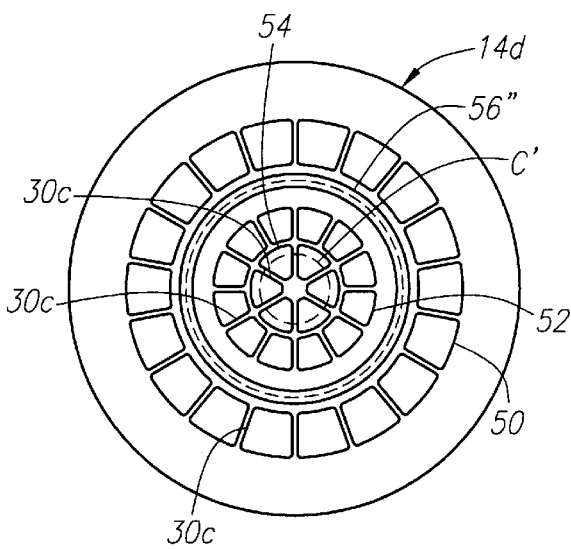

In the typical embodiments of the electrode patterns of the present invention illustrated in FIGS. 3–6, the outer ring 50 of electrodes controls the slope of the mirror by selectively applying voltages to each of the electrode segments 40-1, 40-N in the outer ring 50 to thereby tilt or change the slope of the whole mirror in any desired direction or amount, within the structural limits, for any desired purpose in connection with the adaptive optics system. The inner ring 52 of electrode segments, as well as the central ring 54 of electrode segments in FIG. 6, control the curvature of the mirror surface by applying appropriate voltages to each of the electrode segments. The gaps 30c between electrode segments are large enough to insulate adjacent segments from each other but sufficiently small that the electric field passing through the plates 30 to the grounded layers 34, 36 and 42 migrates and overlaps the segments to provide a smooth transition on the surface of the mirror layer 48 when different voltages are applied to adjacent electrode segments 40-1, 40-N. With this arrangement, a total of approximately one hundred microns (0.1 mm) of deflection of the center of the deformable mirror 14 may be accomplished because, in part, the outer ring 50 can cause a portion of the deflection and the inner ring 52 and central ring 54 can accomplish additional deflection therebeyond, as distinguished from the Shack-Hartmann system using push rods that have a limited displacement of typically eight microns (0.008 mm) from a reference base plate, even at the center of the mirror. FIG. 3 illustrates a basic electrode segment pattern with the functions and advantages thus far described and FIGS. 4–6 illustrate some modifications.

Referring more specifically to FIG. 4, an intermediate ring 56 of a layer of gold is formed in the annular space between the outer ring 50 and inner ring 52 of electrode segments as a modification to the embodiment illustrated in FIG. 3. The intermediate ring 56 is electrically grounded for preventing the build-up of an electrostatic charge on that portion of the surface 30a of plate 30 that may be caused by expansion/contraction and movement of the plate 30 or, conversely, that may cause undesired expansion/contraction and movement of the plate 30. The intermediate ring 56 may be applied at the same time as the gold layer 40 by an appropriate shape of the same mask or may be applied in a subsequent plating step.

Referring more specifically to FIG. 5, an intermediate ring 56' is formed on the surface 30a of plate 30 in the annular space between the outer ring 50 and inner ring 52 of electrode segments for the same purposes as intermediate ring 56 illustrated in FIG. 4. Ring 56' is formed by separate circumferentially extending segments 58, six being shown, with gaps formed between the segments 58 by the same mask during application of the gold layer 40, which simplifies the construction of the mask by having connecting portions for the mask. After the plating step and removal of the mask to form the segments 58, connectors 60 of a conductive material are applied between the segments 58 to connect them into a conductive ring 56' which is grounded. An intermediate ring 56" is also shown in FIG. 6 which may be of the type shown in FIG. 4 or FIG. 5 for the same purposes.

Referring more specifically to FIG. 6, the central ring 54 of electrode segments provides additional control of the curvature of the mirror layer 48 even though a portion of those electrode segments are radially inward from the dashed-circle C' representing the inner extremity of the image. Of course, in a non-reflective type telescope or other system using adaptive optics, these segments of the central ring 54 would be important to controlling the curvature of that portion of the mirror layer 48 since an image would be reflected from that portion.

Referring now to FIGS. 7A–7E, various embodiments of the different layers and different electrode patterns, as well as the electrical connections thereto, of the deformable curvature mirror 14 are diagrammatically illustrated. Specifically, the electrode pattern layer 40 is shown at the top of each Figure as one outer side of the deformable mirror 14 (omitting the terminals 44-1, 44-N and the insulation layer 46 that is coated on electrode layer 40) and the mirror surface layer 48 is shown at the bottom of each Figure as the other side of the deformable mirror 14, with the layers therebetween illustrated in the order from top to bottom that is shown in FIG. 2. In other words, immediately below the electrode layer 40 is the electro-restrictive plate 30, then the gold layer 34, then the adhesive layer 38, then the gold layer 36, then the electro-restrictive plate 32, then the gold layer 42 and finally the mirror layer 48. Some of the layers are illustrated with cross-hatching on their surfaces for distinguishing them with other layers but the cross-hatching is not intended to illustrate a sectional view through such layers. Also, the electrode pattern layers 40 in FIGS. 7A–7D are merely diagrammatic illustrations for showing the differences in the embodiments without necessarily illustrating electrode patterns that would be used commercially. Further, the mounting perimeter portions 30b are omitted for simplicity and clarity. FIGS. 7A–7E also illustrate the electrical connections to the various conductive layers, namely, electrode segment layer 40 and gold layers 34, 36 and 42 of the deformable mirror 14 with the letters "HV" indicating a variable high voltage to the entire layer or each of the individual electrode segments, although for simplicity of illustration only a single line to all of those segments is shown, such as electrode segment layer 40 in FIG. 7A. Further, the ground side of the electrical system is indicated by either the electrical ground symbol, such as shown at the bottom left side of FIG. 7A or the letters "GND".

Referring more specifically to the embodiment of FIG. 7A, which is also typical of the embodiment shown and described with respect to FIG. 2, the gold layers 34, 36 and 42 are all connected to electrical ground as shown on the left side of FIG. 7A. The plurality of electrode segments 40-1 through 40-N of the electrode layer 40 are individually connected to the controllable source of high voltage HV for selectively applying the desired voltage to each segment 40-1, 40-N for deforming the mirror. The electric field is applied across the electro-restrictive plate 30 to the grounded gold layer 34. While the single gold layer 34 may be adequate to ground and conduct all of the electricity supplied from the electrode layer 40, it is preferred that the additional electrical ground of gold layers 36 and 42 be provided to eliminate any possibility of any stray electricity or electrostatic charge affecting the second plate 32 in an uncontrolled manner in this embodiment.

Referring now to FIG. 7B, a different arrangement of the electrode segments for causing controlled deformation of the mirror 14 is shown wherein an outer ring of electrode segments 34-1 through 34-N are provided in the gold layer 34 (rather than in gold layer 40), similar to the outer ring 50 of electrode segments described with respect to FIGS. 3–6 and an annular ring 62 of gold in layer 40 is grounded on the opposite side of plate 30, whereby the slope of the mirror 14 may be controlled, at least in part, by applying the variable high voltages to the segments 34-1 through 34-N so that the electric field is imposed across the electro-restrictive plate 30 to the ground ring 62. Similarly, the second intermediate gold layer 36 is provided with an outer ring of electrode segments 36-1 through 36-N that match and are superimposed on the electrode segments 34-1 through 34-N, respectively, with the conductive adhesive layer therebetween, and an outer gold ring 64 is provided on the bottom of the other electro-restrictive plate 32 as a portion of gold layer 42, which ring 64 is grounded whereby the electric field is imposed between electrode segments 36-1, 36-N of layer 36 through the plate 32 to the ground ring 64. The layer 40 is provided with electrode segments in the central portion comprised of, for example, an inner ring 52, as shown in FIGS. 3–5, or both an inner ring 52 and a central ring 54 as shown in FIG. 6 of electrode segments that are supplied with the variable high voltages for controlling the curvature of the central portion of the deformable mirror 14 from which the image is reflected. The gold layers 34 and 36 are provided with central circles or discs 66 and 68 that are positioned opposite the inner ring and central ring of electrode segments of layer 40 to allow imposition of an electric field from those segments through the electro-restrictive first plate 30 for controlling the curvature of the mirror. The bottom gold layer 42 is also provided with a central disc 70 opposite discs 66 and 68 which may be grounded for the same purposes described with respect to layer 42 in the embodiment of FIG. 7A. In the alternative, disc 70 may be connected to a high voltage source for applying a voltage across the electro-restrictive second plate 32 to the grounded discs 66, 68 for causing a large and uniform deflection of the deformable mirror as an extra focus stroke in addition to the individual curvature deformations caused by the central electrode segments 40-1 through 40-N. The mirror layer 48 may be confined to a central portion approximating or smaller than the size of disc 70 to minimize the possibility of electrical arcing therethrough between ring 64 and disc 70. This arrangement of FIG. 7B allows for twice the stroke in the edge actuators compared to the arrangement of FIG. 7A. When a voltage is applied to one or more of the edge actuator segments 34-1 through 34-N and 36-1 through 36-N, both plates 30 and 32 will respond with an area of one expanding and a corresponding*superimposed) area of the other contracting to essentially double the bending movement. The individual electrode segments 34-1 through 34-N may be electrically connected to the corresponding segments 36-1 through 36-N by holes filled with conductive epoxy.

Referring now to the embodiment of FIG. 7C, again the gold layer 40 is provided with electrode segments 40-1 through 40-N in the inner ring and/or central ring portions that are connected to the variable high voltage source for causing curvature changes in the deformable mirror 14 as in the embodiment of FIG. 7B. The intermediate or center gold layers 34 and 36 are grounded, as in the embodiment of FIG. 7A. The bottom gold layer 42 is provided with an outer ring of segments 42-1 through 42-N, similar to the outer ring 50 of the embodiments shown in FIGS. 3–6, to which variable high voltages are applied for controlling the slope of the deformable mirror 14. The upper gold layer 40 is also provided with an outer ring of segments 40-1 through 40-N that are positioned opposite the segments 42-1 through 42-N, respectively. In addition, bottom gold layer 42 is provided with a central disc 70 that may be grounded or connected to a second high. voltage source for providing the large and uniform deflection of the deformable mirror 14 for extra focus stroke, similar to the disc 70 of the embodiment of FIG. 7B. Similarly, the mirror layer 48 may be limited to the central area of disk 70 to avoid arcing, as described above. This arrangement of FIG. 7C accomplishes the same doubling of the stroke of edge actuators as the arrangement of FIG. 7B but the electrical connections the edge electrode segments is easier.

Referring now to FIG. 7D, another embodiment of the arrangement of the electrode segments and ground layers is illustrated wherein the upper gold layer 40 and central gold layers 34 and 36 may be substantially the same as the embodiment of FIG. 7A wherein both the slope and the curvature of the mirror 14 are controlled by electrode segments provided in outer, inner and central rings of electrode segments 40-1 through 40-N of the gold layer 40 and layers 34 and 36 are grounded. In addition, the bottom gold layer 42 may be connected to a second high voltage source (rather than ground, as in FIG. 7A) for providing an electric field across the second electro-restrictive plate 32 to ground layers 34 and 36 to cause a large and uniform deflection of the deformable mirror 14 for an extra focus stroke, similar to the function of the central disc 70 in the embodiments of FIGS. 7B and 7C when a second high voltage is applied to discs 70.

Referring now to FIG. 7E, another embodiment of the deformable mirror 14 having different uses than the previously described deformable mirrors of this invention is diagrammatically illustrated. An upper gold layer 72 is a single circle or disc rather than having a plurality of electrode segments 40-1 through 40-N, as in the upper gold layer 40 of the previously described embodiments. This embodiment of FIG. 7E includes, in order from the upper layer 72 downward, the electro-restrictive plate 30, the gold layer 34, the conductive adhesive layer 38, the gold layer 36, the electro-restrictive plate 32, the bottom gold layer 42 and the mirror layer 48 which may be constructed in substantially the same manner as described with respect to FIG. 2. The deformable mirror 14e of FIG. 7E has the two central gold layers 34 and 36 connected to a variable high voltage source and the upper gold layer 72 and lower gold layer 42 connected to ground, as illustrated. By applying an electrical potential on layers 34, 36 through the plates 30, 32 to the grounded layers 72, 42, respectively, the entire deformable mirror 14a will be deformed to form a concave surface on the mirror layer 48 whereby the deformable mirror 14a may be used to change the focal length of an image reflected from mirror layer 48. In this embodiment the polarity of the electro-restrictive plates 30, 32 are reversed rather than being aligned because the electric fields therethrough are reversed and thus the deformation is additive. This form of deformable mirror is useful in conjugate tuning of an optical system, as distinguished from wavefront correction in the adaptive optics system, which may be useful in conjunction with a wavefront sensor for conjugate tuning in a data transmission system using light waves. In the embodiment of FIG. 7E, the polarity of the applied electrical potential may be reversed, that is, the central gold layers 34, 36 may be grounded and the outer gold layers 72, 42 may be used for applying the variable high voltage for varying the focal length of the deformable mirror 14e.

Referring again to FIG. 1, it may be seen that the deformable mirrors 14 described in detail with respect to FIGS. 2–6 and 7A–7D and innumerable variations thereof may be used in the optical system of FIG. 1 or any other optical system that is susceptible to adaptive optics for correcting a light wavefront by using the deformable mirror 14 of the present invention. As the light rays R that are reflected by the deformable mirror 14 and received by the wavefront sensor S, which through the CPU applies the appropriate high voltages HV to the respective electrode segments 40-1 through 40-N (or 34-1 through 34-N or 36-1 through 36-N or 42-1 through 42-N in the various embodiments), the slope and curvature of the mirror layer 48 of the mirror 14 are modified continually and instantaneously until the wavefront sensor senses a flat wavefront, as corrected by the deformable mirror 14 in a continuing feedback arrangement, whereby a diffraction limited images is observed at detector D. As changes in the wavefront occur, such changes are sensed by the wavefront sensor S which causes the curvature and/or slope of the deformable mirror 14 to be modified for correcting the change in the wavefront to assure that the wavefront reaching the detector D is continually corrected. Initially, the optical system of FIG. 1 or any similar optical system having an adaptive optics arrangement using the deformable curvature mirror 14, may be calibrated by introducing a controlled light source so that the wavefront sensor S may detect whether the mirror layer 48 of the deformable mirror 14 is providing a diffraction limited image and, if not, such as by reason of manufacturing defects or the like, the wavefront sensor S and CPU can apply appropriate high voltages to the electrode segments of the deformable mirror for correcting the mirror to an optically correct condition. Thereafter, as the optical system is used and the wavefront of the light entering rays R is less than diffraction limited by reason of aberrations in the atmosphere, additional or different high voltages are applied to the deformable mirror 14 from the wavefront sensor S and CPU through the wires W-1 through W-N to the electrode segments of the mirror for correcting the wavefront.

Although the deformable mirror of the present invention has been described in connection with a specific optical system, namely, the telescope illustrated in FIG. 1, it will readily appear to those skilled in the art that the deformable mirror may be used in any optical system in which adaptive optics for correcting the wavefront may be useful, and that numerous variations and modifications of the precise construction of the deformable mirror and the arrangement of the pattern of the electrode segments, in addition to those disclosed herein, may be made without departing from the invention as hereinafter claimed.

What is claimed:

1. A deformable curvature mirror capable of controlled deformation by applying electrical voltages, comprising:

first and second parallel plates of an electro-restrictive material, said plates having parallel adjacent inner surfaces jointed together with a conductive layer sandwiched between said adjacent inner surfaces, said conductive layer having an electrical terminal connected to electrical ground;

said first plate having an outer surface parallel to said inner surface thereof with an unpatterned outer conductive layer on said outer surface and a mirrored surface on said outer conductive layer, said outer conductive layer having an electrical terminal for connected to electrical ground; and said second plate having an outer surface parallel to said inner surface thereof with a pattern of electrode segments on said second plate outer surface, each said segment having a separate electrical terminal for applying a variable electrical voltage thereto for selectively deforming the curvature mirror.

2. The mirror according to claim 1, wherein said pattern of electrode segments includes a subpattern of electrode segments that cause mirror deformation for controlling only the slope of the mirrored surface.

3. The mirror according to claim 1 or 2, wherein said pattern of electrode segments includes a subpattern of electrode segments that cause mirror deformation for controlling only the curvature of the mirrored surface.

4. The mirror according to claim 1, wherein said mirror is circular and said pattern of electrode segments includes an outer ring of electrode segments that cause mirror deformation for controlling the slope of the mirrored surface and an inner ring of electrode segments that cause mirror deformation for controlling the curvature of the mirrored surface.

5. The mirror according to claim 4, wherein said inner ring of electrode segments includes two separate and concentric rings of electrode segments.

6. The mirror according to claim 4, wherein said outer ring of electrode segments are radially outwardly from an area of the mirrored surface on which an image is reflected in an optical system having the deformable curvature mirror.

7. The mirror according to claim 4, wherein said outer and inner rings of electrode segments are separated by an annular space, and a conductive layer ring is provided in said annular space on said outer surface of said second plate for connecting to electrical ground.

8. The mirror according to claim 1, wherein said mirrored surface is comprised of a polished conductive layer.

9. The mirror according to claim 8, wherein said polished conductive layer has an electrical terminal for connecting to a variable electrical voltage.

10. The mirror according to claim 1, wherein said conductive layer sandwiched between said first and second plates is comprised of a first conductive layer on said inner surface of said first plate and a second conductive layer on said inner surface of said second plate.

11. The mirror according to claim 10, wherein a layer of conductive adhesive is provided between said first and second conductive layers for joining said first and second plates.

12. The mirror according to claim 1, wherein said first and second plates are joined together by a layer of conductive adhesive.

13. The mirror according to claim 1, wherein said outer conductive layer on said first plate is annular and located outside an area on which an image is reflected by said mirrored surface, and further including a circular electrode segment between said outer surface of said first plate and said mirrored surface for connecting to a variable voltage for varying the focus of the mirrored surface, said circular electrode segment being located centrally within said annular outer conductive layer.

14. The mirror according to claim 1, wherein said first and second plates each have a polarity oriented in the same direction.

15. A deformable curvature mirror capable of controlled deformation by applying electrical voltages, comprising:

first and second parallel plates of an electro-restrictive material, said plates having parallel adjacent inner surfaces jointed together with a conductive layer sandwiched between said adjacent inner surfaces, said conductive layer having an electrical terminal for connecting to electrical ground;

said first plate having an outer surface parallel to said inner surface thereof with a mirrored surface on said outer surface;

said second plate having an outer surface parallel to said inner surface thereof with a pattern of electrode segments on said second plate outer surface, each said segment having a separate electrical terminal for applying a variable electrical voltage thereto for selectively deforming the curvature mirror; and further including electrode segments also sandwiched between said adjacent inner surfaces of said first and second plates with electrical terminals for applying variable voltages to said sandwiched electrode segments.

16. The mirror according to claim 15, wherein said sandwiched electrode segments are arranged in an outer ring surrounding and separate from said conductive layer.

17. A deformable curvature mirror capable of controlled deformation by applying electrical voltages, comprising:

first and second parallel plates of an electro-restrictive material, said plates having parallel adjacent inner surfaces jointed together with a conductive layer sandwiched between said adjacent inner surfaces, said conductive layer having an electrical terminal for connecting to electrical ground;

said first plate having an outer surface parallel to said inner surface thereof with a mirrored surface on said outer surface;

said second plate having an outer surface parallel to said inner surface thereof with a first pattern of electrode segments on said second plate outer surface, each said segment having a separate electrical terminal for applying a variable electrical voltage thereto for selectively deforming the curvature mirror; and wherein said mirror is circular and further including a second pattern of electrode segments comprising a conductive circular disk and an annular ring of electrode segments encircling said disk located between said outer surface of said first plate and said mirrored layer, said second pattern being different from said first pattern, with said electrode segments in said ring having separate electrical terminals for connecting to a variable electrical voltage.

18. The mirror according to claim 17, wherein said circular disk has an electrical terminal for connecting to electrical ground.

19. The mirror according to claim 17, wherein said circular disk has an electrical terminal for connecting to a variable electrical voltage.

20. A deformable curvature mirror capable of controlled deformation by applying electrical voltages, comprising:

first and second parallel plates of an electro-restrictive material, said plates having parallel adjacent inner surfaces, jointed together with at least one conductive layer sandwiched between said adjacent inner surfaces;

said first and second plates each having a polarity perpendicular to said adjacent inner surfaces with the respective polarities oriented in the same direction;

said first plate having an outer surface parallel to said inner surface thereof with an unpatterned outer conductive layer on said outer surface and a mirrored surface on said outer conductive layer;

each said at least one conductive layer sandwiched between said adjacent inner surfaces and said outer conductive layer on said outer surface of said first plate having an electrical terminal connected to one pole of the electric voltage;

said second plate having an outer surface parallel to said inner surface thereof; and a pattern of a plurality of conductive electrode segments on said second plate outer surface, each said conductive electrode segment having a separate electrical terminal for applying the other pole of a variable electrical voltage thereto for separately transmitting a variable current through each said electrode segment and through at least said second plate for selectively deforming said second plate and, in turn, the curvature mirror.

21. The mirror according to claim 20, wherein said pattern of electrode segments includes a subpattern of electrode segments that cause mirror deformation for controlling only the slope of the mirrored surface.

22. The mirror according to claim 20 or 21, wherein said pattern of electrode segments includes a subpattern of electrode segments that cause mirror deformation for controlling only the curvature of the mirrored surface.

23. The mirror according to claim 20, wherein said mirror is circular and said pattern of electrode segments includes an outer ring of electrode segments that cause mirror deformation for controlling the slope of the mirrored surface and an inner ring of electrode segments that cause mirror deformation for controlling the curvature of the mirrored surface.

24. The mirror according to claim 23, wherein said outer and inner rings of electrode segments are separated by an annular space, and a conductive layer ring is provided in said annular space on said outer surface of said second plate for connecting to electrical ground.

25. The mirror according to claim 20, wherein said conductive layer sandwiched between said first and second plates is comprised of a first conductive layer on said inner surface of said first plate and a second conductive layer on said inner surface of said second plate.

26. The mirror according to claim 25, wherein a layer of conductive adhesive is provided between said first and second conductive layers for joining said first and second plates.

27. The mirror according to claim 20, wherein said first and second plates are joined together by a layer of conductive adhesive.

28. The mirror according to claim 20, wherein said one pole of the electric voltage is grounded for electrical grounding across said first plate inner and outer surfaces.

29. A deformable curvature mirror capable of controlled deformation by applying electrical voltages thereto, comprising:

first and second parallel plates of a piezoelectric material having parallel adjacent inner surfaces, a conductive layer on each inner surface and a conductive adhesive layer joining said conductive layers and said adjacent inner surfaces;

said first and second plates each having a polarity perpendicular to said adjacent surfaces with the respective polarities oriented in the same direction;

said first plate having an outer surface parallel to said inner surface thereof and on an opposite side from said inner surface with an outer conductive layer on said outer surface, and a layer forming a mirrored surface on said outer conductive layer;

each said conductive layer having an electrical terminal for connecting to an electrical ground;

said second plate having an outer surface parallel to said inner surface thereof and on an opposite side from said inner surface; and a pattern of a plurality of conductive layer electrode segments on said second plate outer surface, each said conductive layer electrode segment having a separate electrical terminal for separately applying a variable electrical voltage thereto for separately transmitting a variable electric field through each said electrode segment to said second plate for selectively deforming said second plate and, in turn, the curvature mirror.

30. The mirror according to claim 1, 20 or 29, wherein said electrode segments have gaps between adjacent electrode segments of a sufficiently small width to effectively cause the electrical fields produced by voltages applied to adjacent electrode segments to overlap.

31. A deformable curvature mirror capable of controlled deformation by applying electrical voltages to modify the image reflected from an image area on the mirror, comprising:

first and second parallel plates of an electro-restrictive material, said plates having parallel adjacent inner surfaces jointed together with at least one conductive layer sandwiched between said adjacent inner surfaces and located within at least the image area;

said at least one conductive layer having an electrical terminal for connecting to a first pole of the electric voltages;

said first plate having an outer surface parallel to said inner surface thereof with an outer conductive layer located at least within the image area on said outer surface and a mirrored surface on said outer conductive layer;

said outer conductive layer having an electrical terminal for connecting to a second pole of the electrical voltages;

said second plate having an outer surface parallel to said inner surface thereof; and a pattern of a plurality of conductive electrode segments on said second plate outer surface and located within the image area, each said conductive electrode segment having a separate electrical terminal for connecting to a third pole of a variable electrical voltage for separately transmitting a variable current through each said electrode segment and through said second plate for selectively deforming said second plate and, in turn, the curvature mirror;

wherein the outer surface of at least one of said first and second plates further includes at least one electrode segment outside the image area.

32. The mirror according to claim 31, wherein said pattern of electrode segments includes a subpattern of electrode segments located outside the image area to which the variable voltages are applied that cause mirror deformation for controlling only the slope of the mirrored surface.

33. The mirror according to claim 31 or 32, wherein said pattern of electrode segments includes a subpattern of electrode segments located within the image area to which the variable voltages are applied that cause mirror deformation for controlling only the curvature of the mirrored surface.

34. The mirror according to claim 31, wherein said mirror is circular and said pattern of electrode segments includes an outer ring of electrode segments located outside the image area to which the variable voltages are applied that cause mirror deformation for controlling only the slope of the mirrored surface and an inner ring of electrode segments located within the image area to which the variable voltages are applied that cause mirror deformation for controlling only the curvature of the mirrored surface.

35. The mirror according to claim 34, wherein said outer and inner rings of electrode segments are separated by an annular space, and a conductive layer ring is provided in said annular space on said outer surface of said second plate for connecting to electrical ground.

36. The mirror according to claim 31, wherein said at least one conductive layer between said first and second plates is comprised of a central segment located within the image area, and an outer ring of a second plurality of conductive electrode segments also sandwiched between said adjacent inner surfaces between said first and second plates and located outside the image area, each said conductive electrode segment of said second plurality of conductive electrode segments having a separate electrical terminal for connecting to a fourth pole of a variable electric voltage for separately transmitting a variable current through each said electrode segment.

37. The mirror according to claim 36, wherein said outer conductive layer on said first plate is comprised of a central segment located within the image area, and a conductive outer ring located outside the image area on said outer surface of said first plate and having an electrical terminal connected to said first pole of the electrical voltages.

38. The mirror according to claim 31, wherein said outer conductive layer on said first plate is comprised of a central segment located within the image area, and a second plurality of conductive electrode segments is provided in an annular ring on said outer surface of said first plate encircling said central segment and located outside the image area, each said conductive electrode segment of said second plurality of conductive electrode segments having a separate electrical terminal for connecting to a fourth pole of a variable electric voltage for separately transmitting a variable current through each said electrode segment.

39. The mirror according to claim 31, wherein said at least one conductive layer sandwiched between first and second plates and said outer conductive layer on said first plate extend outside the image area, said first pole is connected to ground, and said second pole is connected to a source of variable electric voltage separate from said third pole.

40. The mirror according to claim 31, wherein said first and second poles are electrically grounded.

* * * * *